(12) United States Patent
Gaddis et al.

(10) Patent No.: US 11,585,489 B2
(45) Date of Patent: Feb. 21, 2023

(54) DIFFERENTIAL PRESSURE FILLING SYSTEM AND METHOD FOR A DOSING VESSEL

(71) Applicant: Chart Inc., Ball Ground, GA (US)

(72) Inventors: Nathan Daniell Gaddis, Jasper, GA (US); Paul Kunst Rybak, Gilroy, CA (US)

(73) Assignee: Chart Inc., Ball Ground, GA (US)

( * ) Notice: Subject to any disclaimer, the term of this patent is extended or adjusted under 35 U.S.C. 154(b) by 292 days.

(21) Appl. No.: 15/794,291

(22) Filed: Oct. 26, 2017

(65) Prior Publication Data
US 2018/0112824 A1   Apr. 26, 2018

Related U.S. Application Data

(60) Provisional application No. 62/412,999, filed on Oct. 26, 2016.

(51) Int. Cl.
*F17C 7/02*   (2006.01)
*F17C 5/04*   (2006.01)
(Continued)

(52) U.S. Cl.
CPC .................. *F17C 5/04* (2013.01); *F17C 7/02* (2013.01); *F17C 13/025* (2013.01); *F17C 13/04* (2013.01);
(Continued)

(58) Field of Classification Search
CPC ...... F17C 2250/0408; F17C 2250/0417; F17C 2250/061; F17C 7/00; F17C 7/02; F17C 9/00
See application file for complete search history.

(56) References Cited

U.S. PATENT DOCUMENTS

| 1,878,317 A | * | 9/1932 | Picard | ...................... F17C 9/02 62/50.2 |
| 3,377,813 A | * | 4/1968 | Mordhorst | ................ F17C 3/08 62/45.1 |

(Continued)

OTHER PUBLICATIONS

International Search Report and Written Opinion, PCT Appl. No. PCT/US2017/058505 70 pages (dated Feb. 13, 2018).

*Primary Examiner* — Brian M King
(74) *Attorney, Agent, or Firm* — Cook Alex Ltd.

(57) ABSTRACT

A dosing vessel includes a reservoir having an inlet and an outlet and is configured to contain a supply of a cryogenic liquid with a headspace above. The outlet is configured to be connected to a dosing arm having a dosing head. A low pressure sensor is configured to detect a vapor pressure in the headspace. A high pressure sensor is configured to detect a pressure in a bottom portion of the reservoir. An inlet valve is in fluid communication with the inlet of the reservoir and is placed in communication with a source of cryogenic liquid. A controller is in communication with the high and low pressure sensors and the inlet valve and is configured to store a preset liquid level or a preset differential pressure corresponding to the preset liquid level, to determine a measured differential pressure based on data from the high and low pressure sensors and to control the inlet valve based on the measured differential pressure and the preset liquid level or the preset differential pressure so that a liquid level of a cryogenic liquid stored in the reservoir is generally maintained at the preset liquid level.

13 Claims, 12 Drawing Sheets

(51) Int. Cl.
    *G01F 23/18*    (2006.01)
    *G01F 13/00*    (2006.01)
    *F17C 13/02*    (2006.01)
    *F17C 13/04*    (2006.01)

(52) U.S. Cl.
    CPC .............. *G01F 13/00* (2013.01); *G01F 23/18* (2013.01); *F17C 2201/0109* (2013.01); *F17C 2201/032* (2013.01); *F17C 2201/054* (2013.01); *F17C 2203/0391* (2013.01); *F17C 2205/018* (2013.01); *F17C 2205/0364* (2013.01); *F17C 2221/014* (2013.01); *F17C 2223/0161* (2013.01); *F17C 2223/033* (2013.01); *F17C 2250/03* (2013.01); *F17C 2250/043* (2013.01); *F17C 2250/061* (2013.01); *F17C 2250/0626* (2013.01); *F17C 2260/024* (2013.01); *F17C 2270/05* (2013.01)

(56) References Cited

U.S. PATENT DOCUMENTS

| | | | | |
|---|---|---|---|---|
| 3,433,249 A | * | 3/1969 | Nelson | G05D 9/02 137/403 |
| 4,805,806 A | * | 2/1989 | Smith | B65B 31/006 222/146.6 |
| 5,360,139 A | * | 11/1994 | Goode | F17C 5/007 222/64 |
| 5,513,961 A | * | 5/1996 | Engdahl | F17C 9/00 417/313 |
| 5,533,341 A | * | 7/1996 | Schvester | B65B 31/006 62/50.1 |
| 6,047,553 A | * | 4/2000 | Germain | B65B 31/006 62/50.1 |
| 6,070,416 A | * | 6/2000 | Germain | A23L 3/362 62/374 |
| 6,182,715 B1 | * | 2/2001 | Ziegler | B65B 31/006 141/285 |
| 6,505,470 B1 | * | 1/2003 | Drube | F17C 13/021 62/49.2 |
| 6,902,648 B2 | * | 6/2005 | Numata | H01J 37/32522 118/723 E |
| 6,912,858 B2 | | 7/2005 | White | |
| 2005/0083198 A1 | * | 4/2005 | Bulin | F17C 13/02 340/539.22 |
| 2006/0218941 A1 | * | 10/2006 | Drube | F17C 5/02 62/50.2 |
| 2013/0305745 A1 | | 11/2013 | Drube et al. | |

* cited by examiner

DIFFERENTIAL PRESSURE FILLING SYSTEM AND METHOD FOR A DOSING VESSEL

CLAIM OF PRIORITY

This application claims the benefit of U.S. Provisional Application No. 62/412,999, filed Oct. 26, 2016, the contents of which are hereby incorporated by reference.

FIELD OF THE INVENTION

The present disclosure relates generally to cryogenic fluid dispensing systems and, in particular, to a dosing vessel that uses a differential pressure within the vessel to control filling.

BACKGROUND

Cryogenic fluids, that is, fluids having a boiling point generally below −150° C. at atmospheric pressure, are used in a variety of industrial applications. One example is in the packaging of food, beverages and other products.

One part of liquid nitrogen (a cryogenic fluid) warms and expands into 700 parts of gaseous nitrogen at ambient temperature. Based on this characteristic, automated dosing equipment and systems have been developed that precisely dispense measured doses of liquid nitrogen into product containers prior to sealing. The trapped liquid nitrogen vaporizes and thus creates pressure within the container so as to add rigidity to the container. This allows for a use of a thinner container wall which reduces material costs and weight. Alternatively, for preservation and modified packaging (MAP) applications, the rapidly expanding gas is allowed to escape before the product packaging is sealed, flushing out oxygen and extending product life. In still another application, a dose of liquid nitrogen is introduced to "lock in" and surface freeze the food product (such as novelty ice cream).

Figure 1:
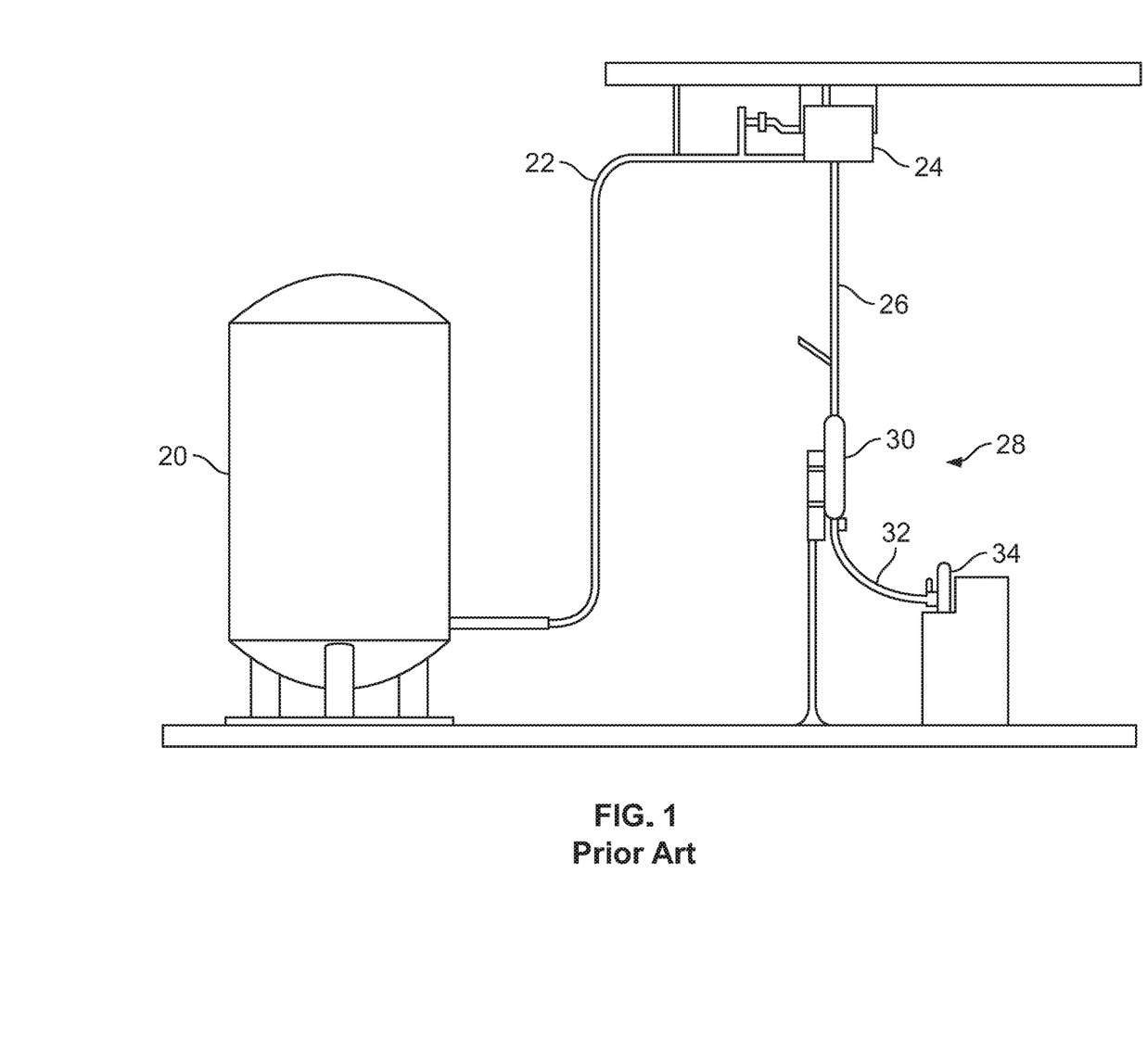
FIG. 1 is a schematic view of a prior art dosing system.
Figures 2A, 2B, 3:
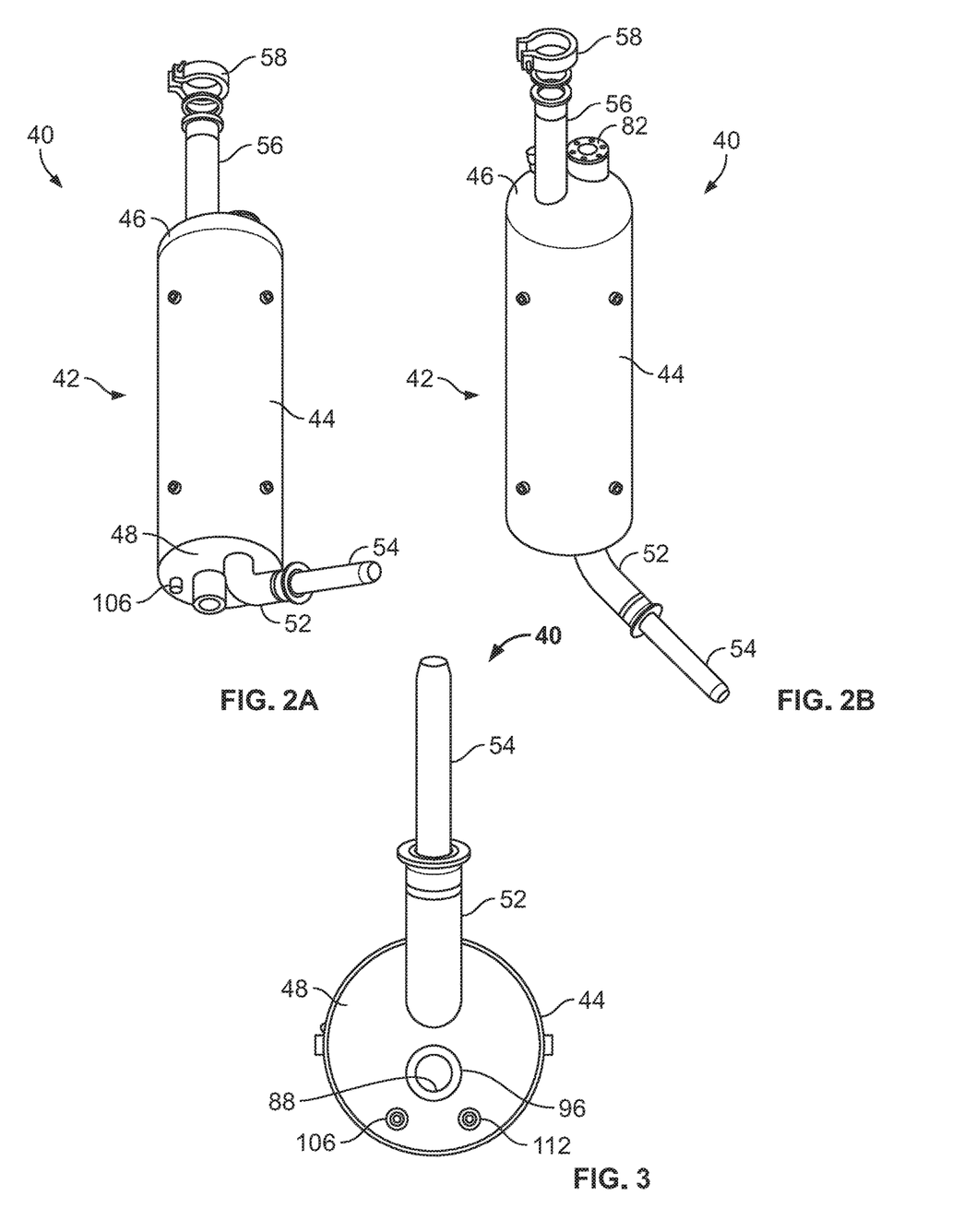
FIGS. 2A and 2B are bottom perspective and top perspective views, respectively, of a dosing vessel equipped with an embodiment of a differential pressure filling system.
FIG. 3 is a bottom plan view of the dosing vessel of FIGS. 2A and 2B.
Figure 4:
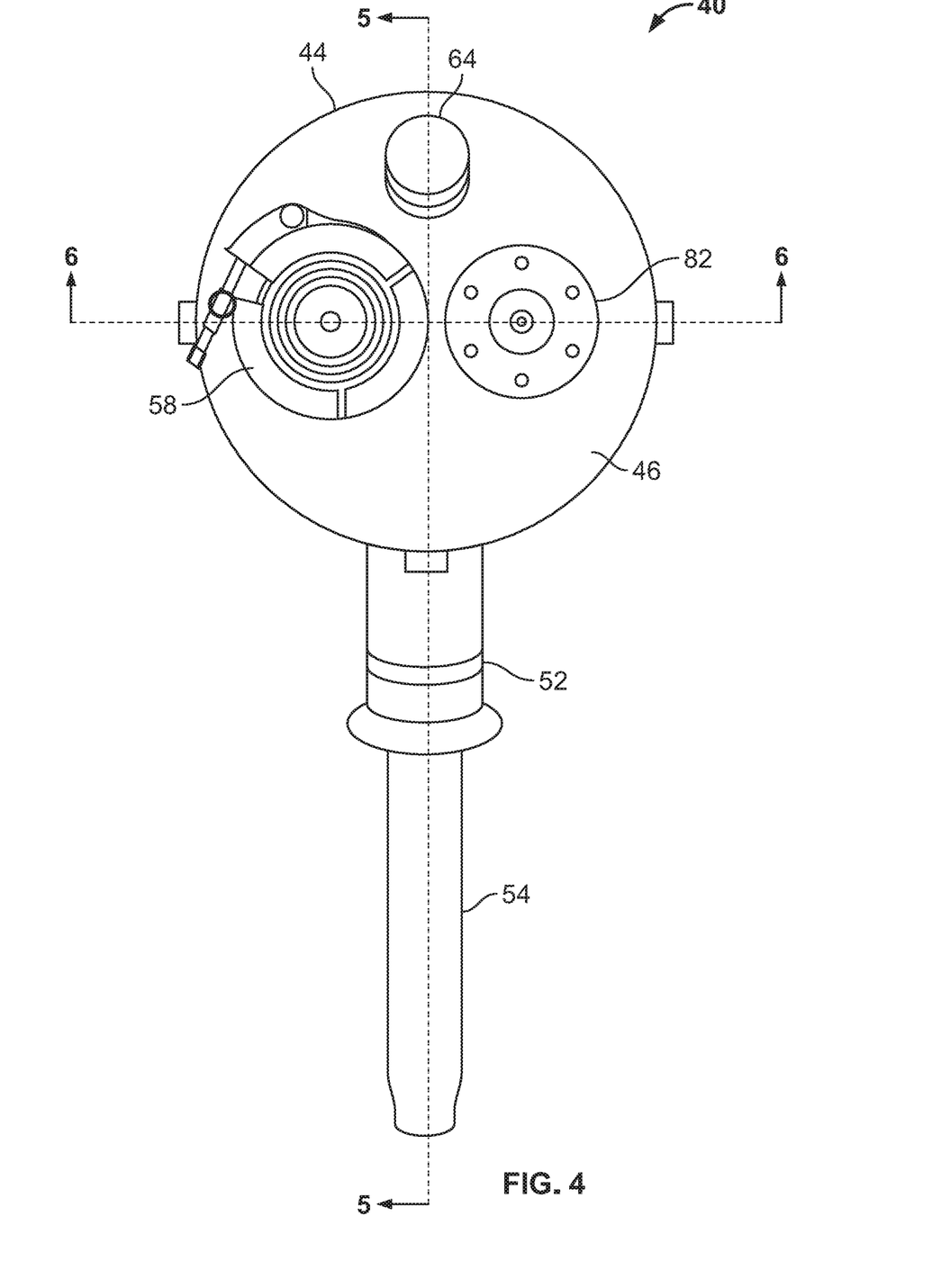
FIG. 4 is a top plan view of the dosing vessel of FIGS. 2A-3.

A typical prior art dosing system is illustrated in FIG. 1. The liquid nitrogen is stored in a vacuum-insulated bulk tank 20 and transferred, via vacuum-insulated piping 22, to a phase separator 24. Liquid nitrogen is then provided via line 26 to a doser, indicated in general at 28. The doser includes a dosing vessel 30 which houses an insulated cryogen source reservoir that receives the liquid nitrogen from line 26. A dosing arm 32 is connected to the dosing vessel 30 and is in communication with the cryogen source reservoir. A dosing head 34 is positioned on the distal end of the dosing arm. The dosing arm 32 includes vacuum-insulated piping so that liquid nitrogen is supplied from the cryogen source reservoir of the doser body to the dosing head 34. A conveyer of a product packaging system passes below the dosing head. The dosing head includes a valve that dispenses or injects droplets including very precise amounts of liquid nitrogen into product containers as they pass below the dosing head on the conveyer.

The dosing vessel 30 must maintain a minimum liquid level for the doser to function properly. If the liquid level in the dosing vessel drops below the minimum level, the liquid nitrogen traveling to the dosing head will not have sufficient pressure to be properly dispensed.

Current liquid level technology in dosing equipment includes either a mechanical float valve or an electromechanical sensor with magnetic floats. Mechanical floats cannot accept higher pressure applications, and both versions are prone to freezing in certain conditions. A dosing vessel with liquid level sensor technology that addresses at least some of these issues is desirable.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a dosing vessel includes a reservoir having an inlet and an outlet. The reservoir is configured to contain a supply of a cryogenic liquid with a headspace above and the outlet is configured to be connected to a dosing arm having a dosing head. A low pressure sensor is configured to detect a vapor pressure in the headspace of the reservoir while a high pressure sensor is configured to detect a pressure in a bottom portion of the reservoir. An inlet valve is in fluid communication with the inlet of the reservoir and is configured to be placed in communication with a source of cryogenic liquid. A controller is in communication with the high and low pressure sensors and the inlet valve. The controller is configured to store a preset liquid level or a preset differential pressure corresponding to the preset liquid level and to determine a measured differential pressure based on data from the high and low pressure sensors and to control the inlet valve based on the measured differential pressure and the preset liquid level or the preset differential pressure so that a liquid level of a cryogenic liquid stored in the reservoir is generally maintained at the preset liquid level.

In another aspect, a system for controlling filling of a vessel with a cryogenic liquid includes a low pressure sensor configured to detect a vapor pressure in a headspace of the vessel. A high pressure sensor is configured to detect a pressure in a bottom portion of the vessel. An inlet valve configured for fluid communication between the vessel and a source of cryogenic liquid. A controller is in communication with the high and low pressure sensors and the inlet valve. The controller is configured to store a preset liquid level or a preset differential pressure corresponding to the preset liquid level and to determine a measured differential pressure based on data from the high and low pressure sensors and to control the inlet valve based on the measured differential pressure and the preset liquid level or the preset differential pressure so that a liquid level of a cryogenic liquid stored in the vessel is generally maintained at the preset liquid level.

In yet another aspect, a method for controlling filling of vessel using an inlet valve that is in fluid communication with a source of cryogenic liquid includes the steps of storing a preset liquid level or a preset differential pressure corresponding to the preset liquid level, measuring a low pressure in a headspace of the vessel, measuring a high pressure in a bottom portion of the vessel, subtracting the low pressure from the high pressure to determine a measured differential pressure, and controlling the inlet valve based on the measured differential pressure and the preset liquid level or the preset differential pressure so that a liquid level of a cryogenic liquid stored in the vessel is generally maintained at the preset liquid level.

DETAILED DESCRIPTION OF EMBODIMENTS

While the invention is described below in terms of dosing vessels and systems for dosing that inject droplets of liquid nitrogen into product packaging, it may be used with other types of vessels, systems and cryogenic fluids.

An embodiment of a dosing vessel is indicated in general at 40 in FIGS. 2A-6. The dosing vessel includes an outer shell, indicted in general at 42 in FIGS. 2A and 2B, having a cylindrical side wall 44 and a top cap and bottom end plate, indicated at 46 and 48, respectively.

A vacuum insulated gooseneck shaped outlet fitting 52 exits the bottom of the vessel and is preferably provided with a male bayonet connector 54 for connecting to the proximal end of a dosing arm (53 in FIGS. 13 and 14) having a dosing head (55 in FIGS. 13 and 14) at the distal end. In alternative embodiments, the dosing arm may be permanently attached to the dosing vessel or removably attached using attachment arrangements known in the art.

The dosing vessel, as described previously with reference to FIG. 1, receives liquid nitrogen via an inlet fitting 56 that is attached to a liquid nitrogen supply line via clamp 58.

As illustrated in FIGS. 5-8, a reservoir 62 is positioned within the outer shell so that a space is defined therebetween. The space is preferably evacuated of air via the connection of vacuum equipment to port 64 (also shown in FIG. 4), which is provided with a removable plug. As a result, the reservoir 62 is vacuum insulated.

Inlet fitting 56 is in fluid communication with line 64, which leads to valve housing 66. An additional line 70 extends between the valve housing 66 and a fill housing 72. The fill housing contains a chamber which is in fluid communication with line 70 and a fill tube 74.

Figure 6:
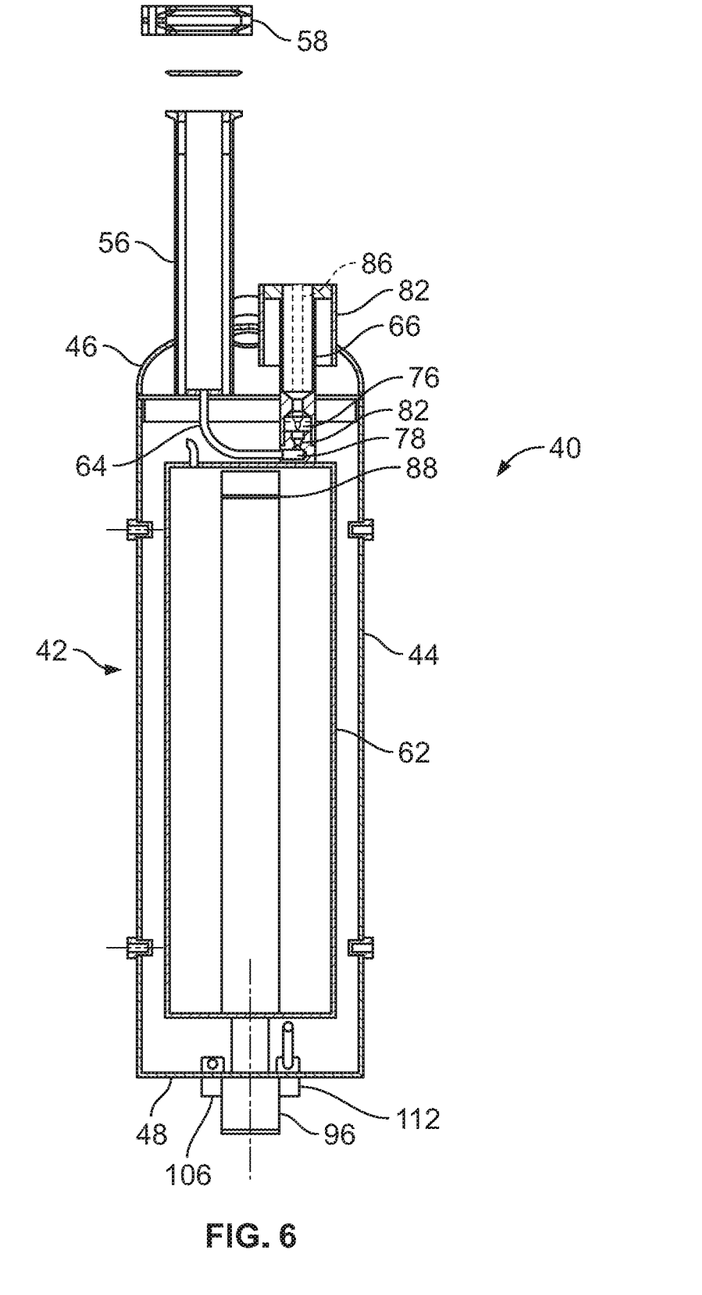
FIG. 6 is a cross sectional view of the dosing vessel of FIGS. 2A-5 taken along line 6-6 of FIG. 4.

As illustrated in FIG. 6, valve housing 66 includes an upper chamber 76 and a lower chamber 78. A tapered orifice 82 is positioned therebetween so that liquid nitrogen entering the bottom chamber 78 via line 64 is able to travel to the upper chamber 76 when the orifice 82 is unobstructed. The upper chamber 76 of the valve housing 66 is in fluid communication with line 70 (FIGS. 7 and 8).

Figure 7:
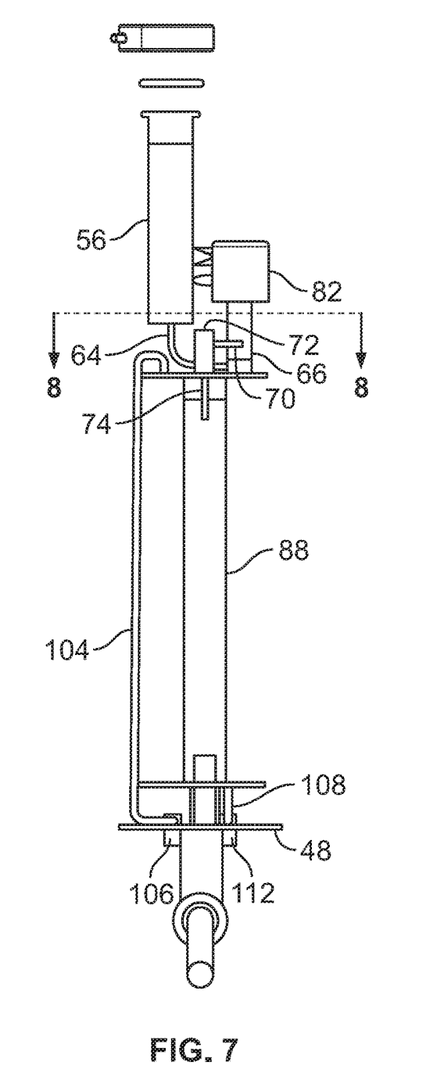
FIG. 7 is a side elevational view of the dosing vessels of FIGS. 2A-6 with the shell sidewall and top removed and the reservoir sidewall removed.
Figure 8:
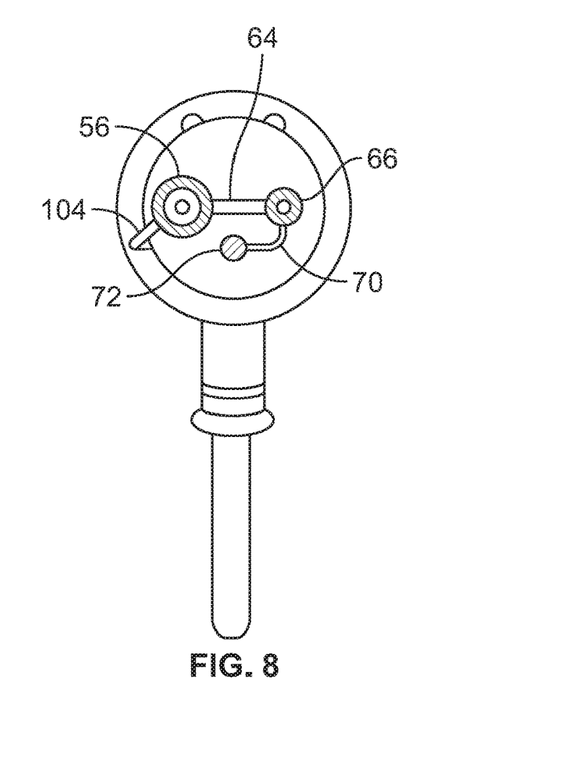
FIG. 8 is a cross sectional view of the dosing vessel of FIG. 7 taken along line 8-8 of FIG. 7.

With reference to FIGS. 6 and 7, a valve actuator mount 82 is positioned on the top of the valve housing 66. An inlet valve actuator (shown at 84 in FIGS. 13 and 14) is mounted upon the mount 82 and includes a needle valve member (indicated in phantom at 86 in the open position in FIG. 6) with a tip that is tapered so that an inlet valve is formed within the valve housing 66. The inlet valve actuator moves the needle valve member between the open position (shown in FIG. 6) and a closed position, where the tapered tip of the valve member 86 is received within, and seals, the tapered orifice 82 of the valve housing 66.

Figure 5:
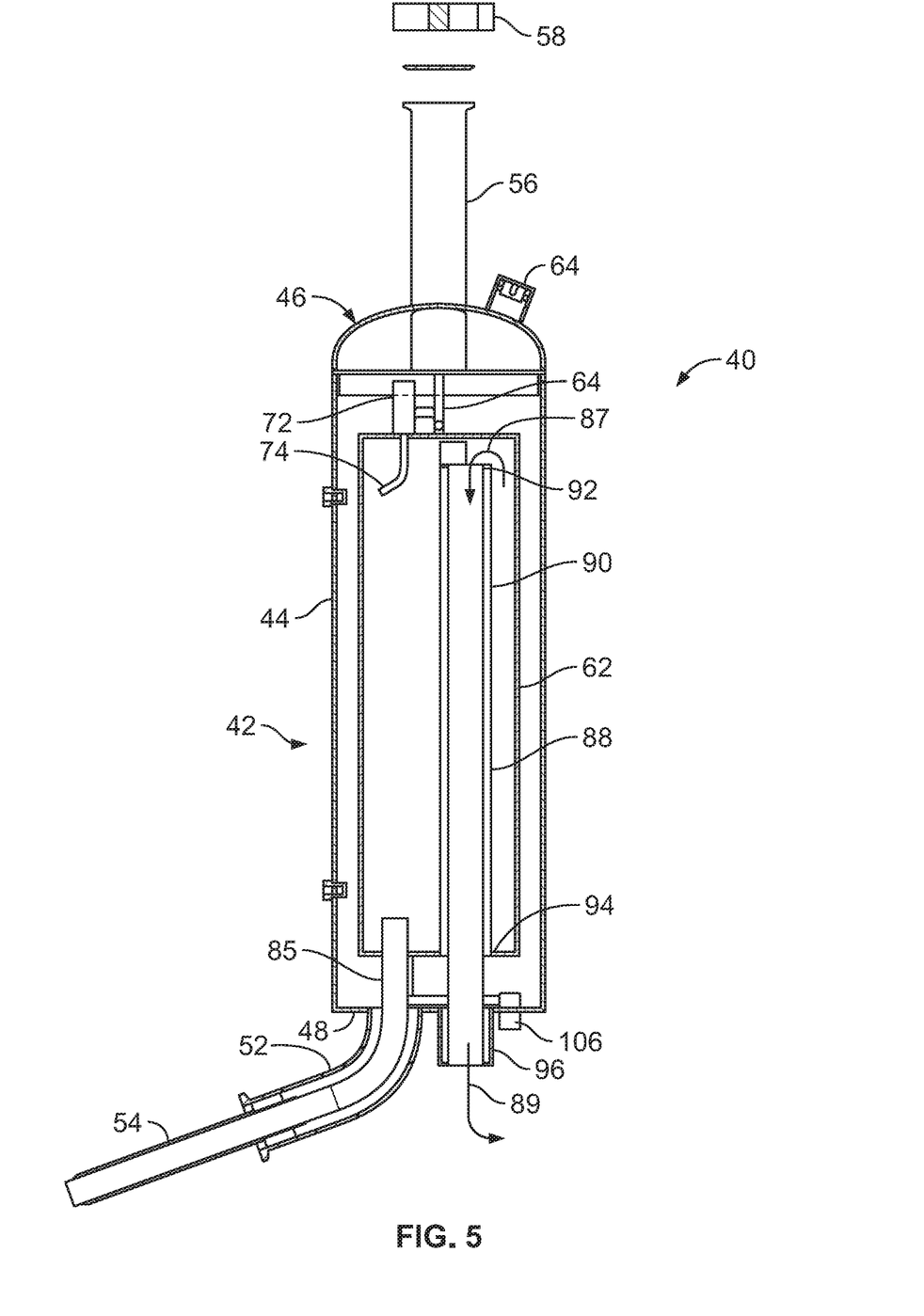
FIG. 5 is a cross sectional view of the dosing vessel of FIGS. 2A-4 taken along line 5-5 of FIG. 4.

As best shown in FIG. 5, the fill tube exit is positioned within the interior chamber of the reservoir 62. As a result, when the needle valve member 86 is in the open position (FIG. 6), liquid nitrogen flows into the reservoir. This filling continues until the needle valve member 86 is lowered into the closed position. The liquid nitrogen within the reservoir 62 exits the bottom of the reservoir through pipe 85, and travels through the dosing arm to the dosing head for dispensing.

As shown in FIGS. 5-7 a vent tube 88 is positioned within the interior chamber of the reservoir 62 and has an open top end in fluid communication with the headspace of the reservoir. The bottom portion of the vent tube 88 exits bottom ends of the reservoir 62 and the shell 42 so that the open bottom end of the vent tube 88 is exposed to ambient. As a result, as indicated by arrows 87 and 89 in FIG. 5, vapor within the headspace of the reservoir exits through the vent tube as the reservoir is being filled with liquid nitrogen. As an example only, the reservoir may be filled with liquid nitrogen (91 in FIG. 10) to a preset level that is approximately one to two inches below the top opening of the vent tube 88.

With reference to FIG. 5, an outer jacket 90 surrounds the portion of the vent tube 88 within the reservoir 62 so that an annular space is formed therebetween. An annular shaped top spacer 92 and an annular shaped bottom spacer 94 are attached to, and extend between, the vent tube 88 and the outer jacket 90 so that the annular space may be evacuated of air. The bottom portion of the vent tube 88 that is exterior to the shell 42 is similarly provided with an outer jacket 96 to provide vacuum insulation for the portion of the vent tube outside of the jacket. The vacuum insulation provided for the vent tube 88 prevents a thermal short circuit between the cold liquid nitrogen in the reservoir 62 and the shell 42 from occurring so that the dosing vessel does not ice up.

Figure 9:
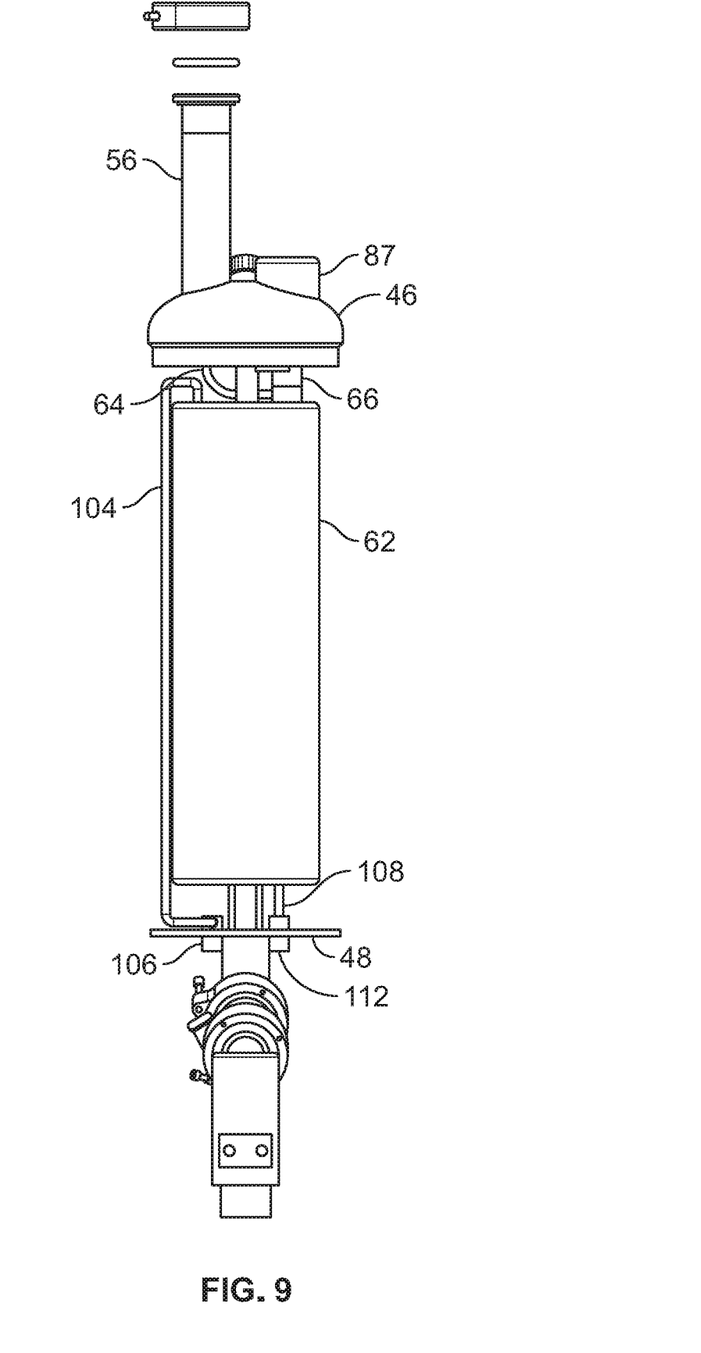
FIG. 9 is a front elevational view of the dosing vessel of FIG. 7 with the reservoir sidewall and shell top added.
Figure 10:
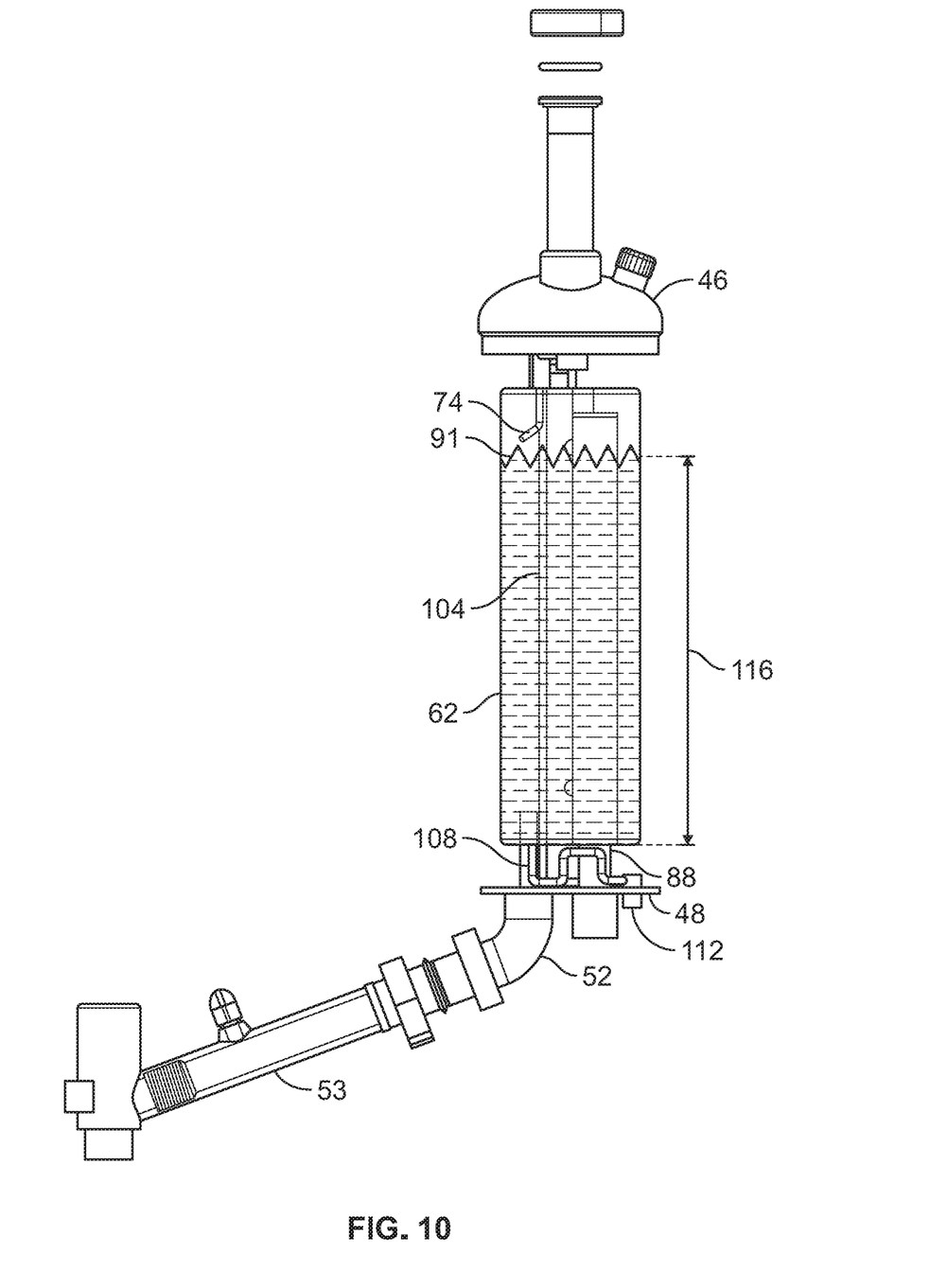
FIG. 10 is a side elevational view of the dosing vessel of FIG. 9 with the reservoir illustrated as transparent.

With reference to FIGS. 7, 9 and 10, a low phase tube 104 has an open top end in fluid communication with the headspace of the reservoir 62 and a bottom end in fluid communication with a low phase pressure sensor, such as a pressure transducer 106. A high phase tube 108 has an open top end in fluid communication with the bottom of the chamber of the reservoir 62 and a bottom end in fluid communication with a high phase pressure sensor, such as a pressure transducer 112. As a result, the low phase pressure sensor 106 measures the vapor pressure in the head space of the reservoir ($P_v$), while the high phase pressure sensor 112 measures the pressure at the bottom of the chamber of the reservoir ($P_b$). As an example only, the transducers each may be a model no. PT15PSIG-13-LU2-H1131 transducer available from Turck Inc. of Minneapolis, Minn.

Figure 13:
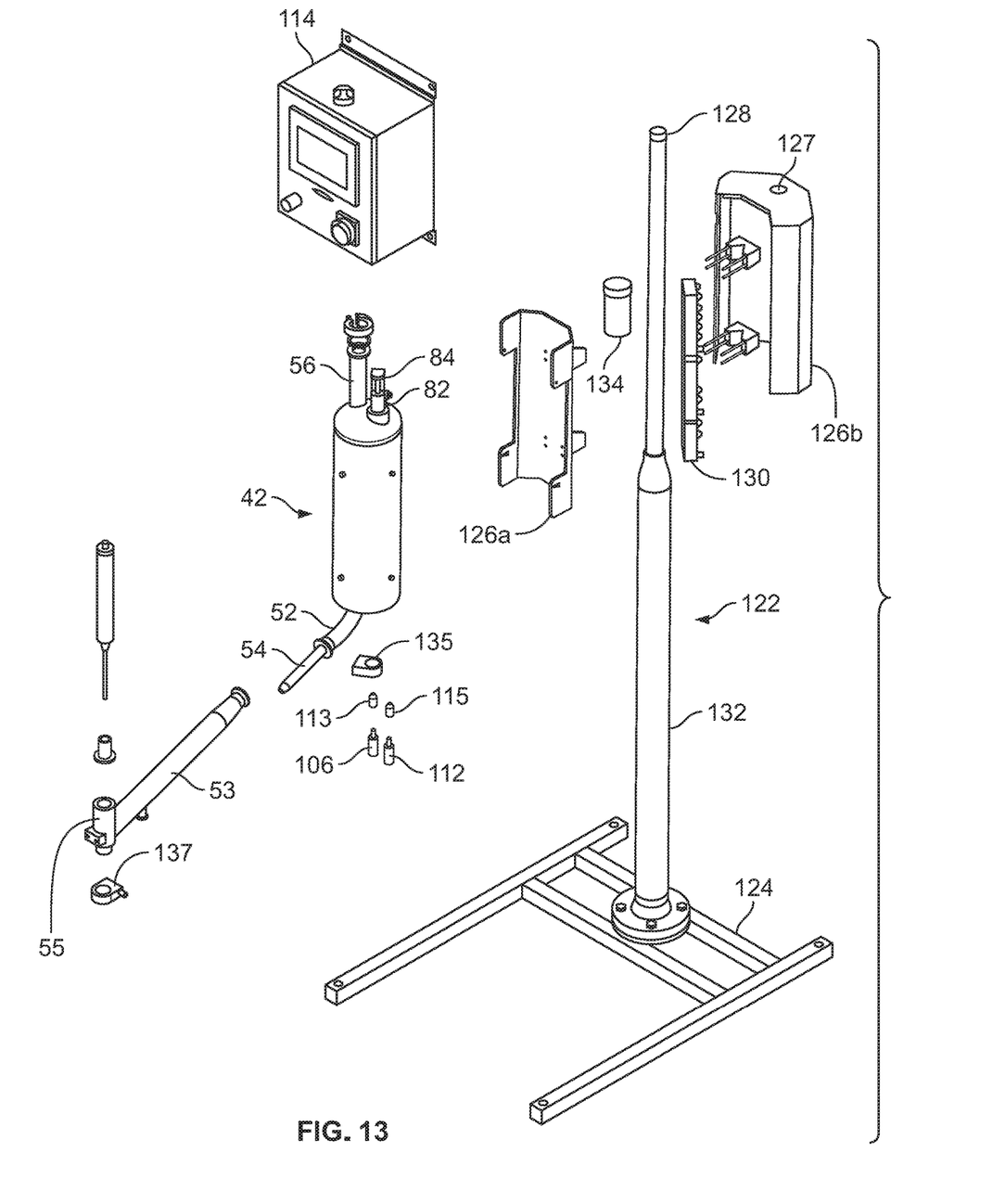
FIG. 13 is a perspective view of the dosing vessel of FIGS. 2A-10 and an exploded view of components for mounting the dosing vessel on a stand.

Both the low phase tube 104 and the high phase tube 108 are positioned within the vacuum space between the reservoir 62 and the shell (42 of FIGS. 2A, 2B, 5 and 6), and the pressure transducers 106 and 112 are mounted to the bottom plate 48 of the shell of the dosing vessel 42 via adapter fittings (113 and 115 in FIG. 13). Of course the pressure transducers 106 and 112 may be positioned anywhere on the dosing vessel shell, on the dosing vessel in general or off of the dosing vessel. In addition, as described below, less than two pressure transducers may be used.

Figure 11:
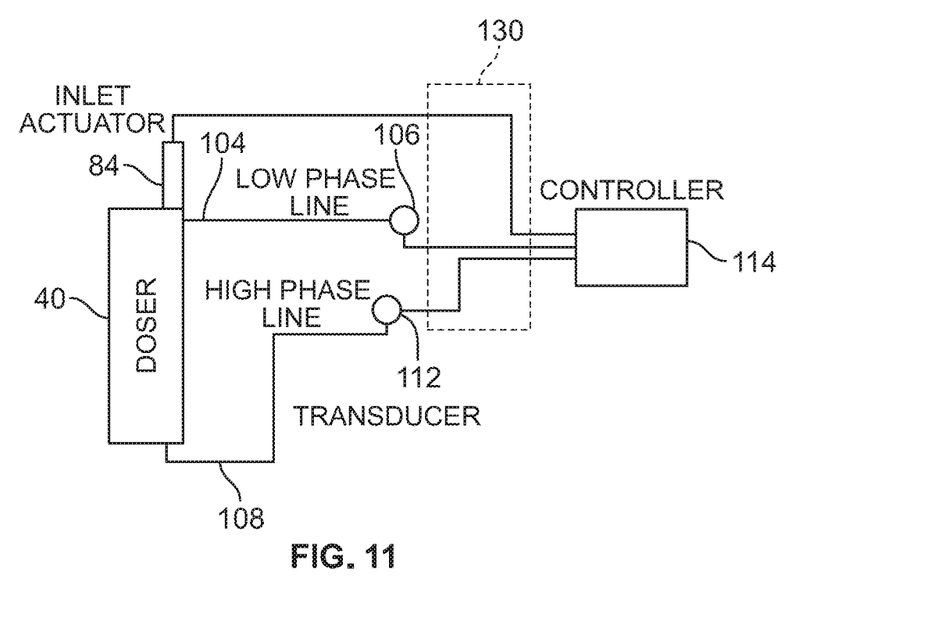
FIG. 11 is a schematic of the differential pressure filling system of the dosing vessel of FIGS. 2A-10.

As illustrated in FIG. 11, the low phase pressure sensor 106 and the high phase pressure sensor 112 each provides an electrical signal to a controller 114 indicative of the pressure measured by the sensor. The controller 114 receives the pressure signals and is programmed to compute the liquid level (116 in FIG. 10) of the liquid nitrogen in the chamber of the reservoir. More specifically, the controller subtracts the vapor pressure from the bottom pressure to obtain the differential pressure, which is the liquid head pressure ($P_h$) as follows:

$$P_h = P_b - P_v$$

The approximate density ($\rho$) of the liquid nitrogen (based on the known approximate temperature of the liquid nitrogen) is stored within the controller. As a result, the following equation may be solved by the controller to determine the measured height (h) of the liquid in the reservoir 62 (the liquid level 116 in FIG. 10):

$$h = P_h / (\rho \times g)$$

where g=acceleration of gravity (9.81 m/s² or 32.17405 ft/s²)

As indicated in FIG. 11, the controller 114 is also electrically connected to the inlet valve actuator 84. The controller compares the measured height of the liquid level in the reservoir 62 ("h" in the equation above) with a preset liquid level height and, if the measured height h is less than the preset height, the controller 114 sends a signal to the inlet valve actuator so that the needle valve member (86 in FIG. 6) is raised to the open position so that liquid nitrogen may flow into the reservoir 62. When the measured height of the liquid level reaches the preset height, the controller 114 sends a signal to the inlet valve actuator to move the needle valve member into the closed position to terminate the flow of liquid nitrogen into the reservoir. As a result, the level of liquid nitrogen within the reservoir of the dosing vessel is maintained at a level to provide a generally consistent pressure for the liquid nitrogen exiting the vessel (via outlet fitting 52 of FIGS. 2A-5), and thus a generally constant dispensing pressure at the dosing head. As indicated at 116 in FIG. 10, the preset liquid level is calibrated so that the maximum fill level is restricted to prevent overfill which would otherwise result in liquid splashing out of the vent tube 88.

Figure 12:
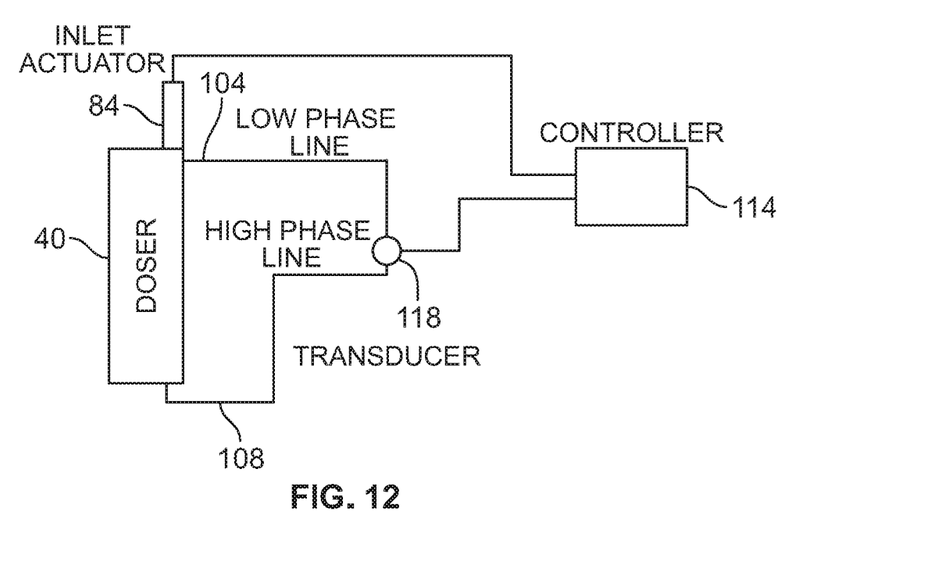
FIG. 12 is a schematic of a differential pressure filling system in an alternative embodiment of the dosing vessel.

In an alternative embodiment, illustrated in FIG. 12, both of the low phase line 104 and the high phase line 108 are in fluid communication with a single transducer 118 that constantly reads the difference in pressure between the high and low phase (i.e. the differential pressure). The controller 114 is in communication with the transducer 118 and, once the detected differential pressure drops below a preset differential pressure, the controller operates the inlet valve actuator 84 in the manner described above to open the inlet valve to allow the dosing vessel reservoir to refill with liquid nitrogen. Any other arrangement known in the art for detecting the vapor pressure in the headspace of the reservoir and at the bottom of the reservoir, and providing this data to the controller, may be used.

Figure 14:
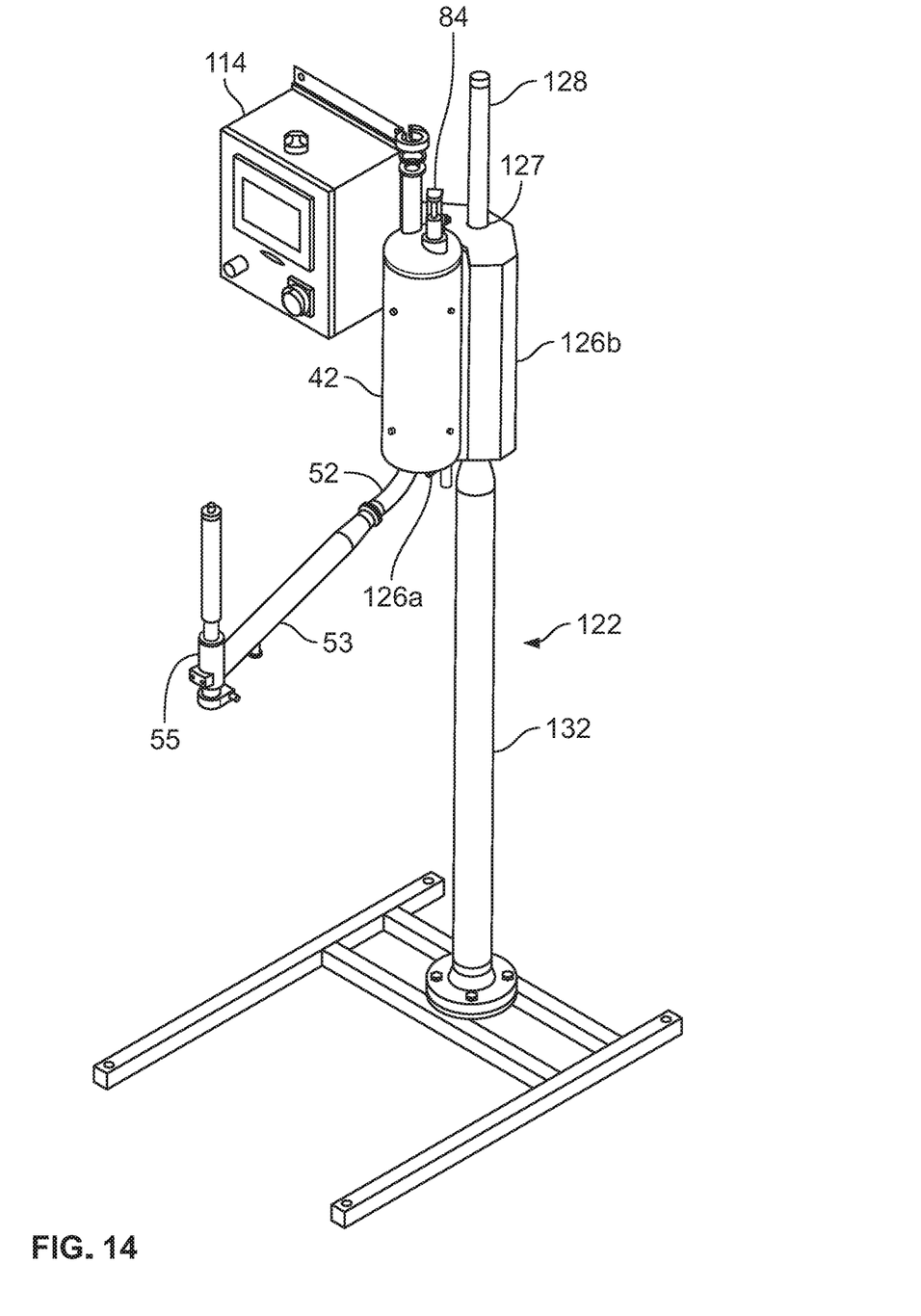
FIG. 14 is a perspective assembled view of the dosing vessel and components of FIG. 13.

As illustrated in FIGS. 13 and 14, the dosing vessel 42 may be mounted on a stand, indicated in general at 122, having a base 124, an upper portion 128 and a lower portion 132. The dosing vessel is mounted to the stand via a bracket having front section 126a and back section 126b. The upper portion 128 of the stand passes through an opening 127 of the back section 126b and the front section 126a is attached to the dosing vessel 42. The front section 126a is then attached to the back section 126b with a bus 130 sandwiched between therebetween. As illustrated at 130 in FIG. 11, the bus 130 provides electrical communication between the controller 114 and the high and low phase transducers 106 and 112 (or single transducer 118 of FIG. 12), as well as the inlet valve actuator 84.

A purge heater assembly (indicated at 134 in FIG. 13) and system may optionally be provided. The purge heater assembly forces heated gas through the dosing unit to unfreeze and dry any moisture that may have accumulated prior to starting up the doser. More specifically, with reference to FIG. 13, a dosing vessel heater collar 135 may optionally be positioned on or at the bottom portion of the vent tube 88 (FIG. 5), below the shell 42 while a dosing head heater collar 137 is provided for the dosing head nozzle. Dry nitrogen gas is supplied to the purge heater assembly from the same source supplying the doser. When the heated purge cycle is activated, two solenoids open allowing gas to enter the purge heater assembly 134, where it is warmed. The heated gas is then piped to the heater collars 135 and 137 for thawing and drying.

Figure 15A:
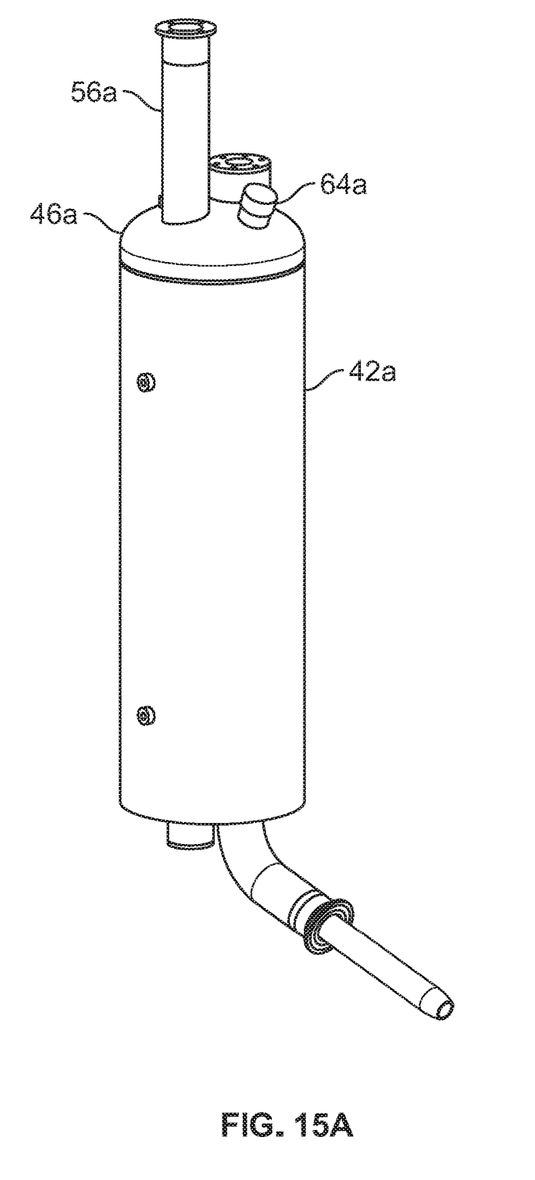
FIG. 15A is a perspective view of an alternative embodiment of the dosing vessel.
Figure 15B:
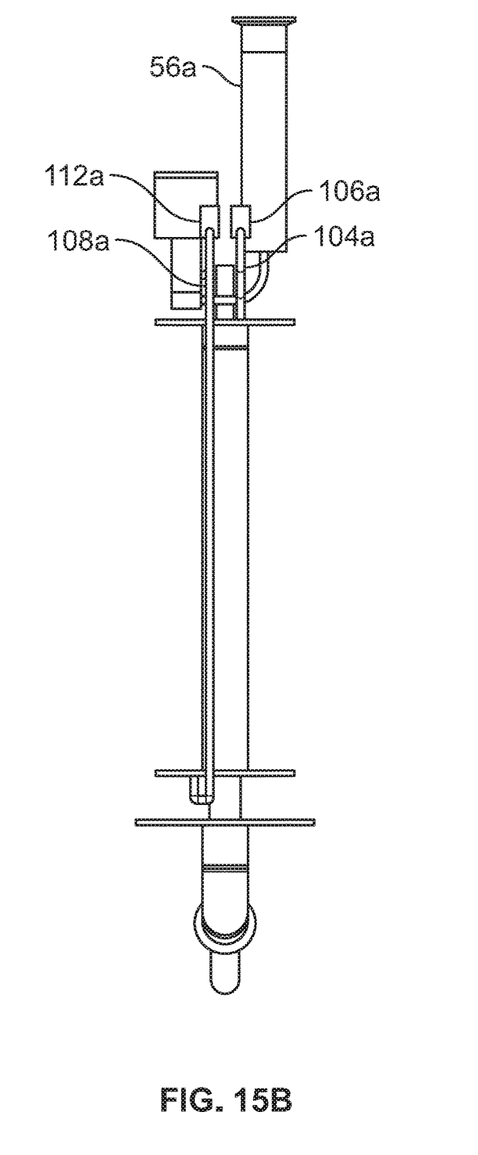
FIG. 15B is a side elevational view of the dosing vessel of FIG. 15A with the shell and reservoir sidewall removed.

In an alternative embodiment, illustrated in FIGS. 15A and 15B, the low and high phase pressure sensors 106a and 112a are both mounted within the top portion of the shell 42a of the dosing vessel, within the space defined by top cap 46a. As a result, high phase tube 108a must run from the bottom of the reservoir to the top portion of the vessel while both the low phase tube 104a and the high phase tube 108a are positioned within the vacuum space between the reservoir and the shell 42a. An orifice is provided through the plug of port 64a (positioned next to liquid nitrogen inlet fitting 56a) so that the sensors are able to communicate with the system controller (114 in FIGS. 11 and 12).

A pressure transducer has no moving parts and thus results in a more cost effective and reliable product. It also provides the operator with greater flexibility as a lower dispensing pressure may be easily selected. This can be accomplished by changing the height at which the dosing vessel maintains a liquid column via an alternate setting in the controller, resulting in a lower pressure nitrogen droplet.

While the preferred embodiments of the disclosure have been shown and described, it will be apparent to those skilled in the art that changes and modifications may be made therein without departing from the spirit of the disclosure, the scope of which is defined by the following claims.

What is claimed is:

1. A dosing vessel comprising:
   a. a reservoir having an inlet and a liquid outlet, said reservoir configured to contain a supply of a cryogenic liquid with a headspace above;
   b. a dosing arm having a dosing head, said dosing arm connected to and in fluid communication with the liquid outlet;

c. a low pressure sensor configured to detect a vapor pressure in the headspace of the reservoir;
d. a high pressure sensor configured to detect a pressure in a bottom portion of the reservoir;
e. an inlet valve in fluid communication with the inlet of the reservoir and configured to be placed in communication with a source of cryogenic liquid;
f. a controller in communication with the high and low pressure sensors and the inlet valve, said controller configured to store a preset liquid level height or a preset differential pressure corresponding to the preset liquid level height and to determine a measured liquid level height using a measured differential pressure based on data from the high and low pressure sensors and to control the inlet valve based on the measured liquid level height and the preset liquid level height or the preset differential pressure so that a liquid level of a cryogenic liquid stored in the reservoir is generally maintained at the preset liquid level while the cryogenic liquid exits the reservoir through the liquid outlet and is dispensed through the dosing head thereby providing a generally constant dispensing pressure at the dosing head;
g. an outer shell having a cylindrical side wall, a top cap and bottom end plate, said reservoir positioned within the outer shell with an insulation space defined between the reservoir and the outer shell, said space generally evacuated of air so as to provide the reservoir with vacuum insulation;
f. said low pressure sensor including a low pressure phase line having a first end in fluid communication with the headspace of the reservoir and the high pressure sensor includes a high pressure phase line having a first end in fluid communication with the bottom portion of the reservoir, each of said low and high pressure lines terminating in a second end that is fastened to and in fluid communication with a transducer that is in communication with the controller; and
g. a majority portion of each of said low pressure phase line and said high pressure phase line being entirely positioned within the insulation space.

2. The dosing vessel of claim 1 wherein the controller is configured to open the inlet valve when the measured liquid level height is below the preset liquid level height.

3. The dosing vessel of claim 1 wherein the controller is configured to compare the measured differential pressure with the preset differential pressure and to open the inlet valve when the measured differential pressure is below the preset differential pressure.

4. The dosing vessel of claim 1 further comprising a vent tube having a first end in fluid communication with the head space and a bottom end in fluid communication with ambient air.

5. The dosing vessel of claim 4 wherein a bottom portion of the vent tube passes through a bottom of the reservoir and a bottom of the shell.

6. The dosing vessel of claim 4 wherein at least a portion of the vent tube is provided with a jacket so that an annular space is defined between the vent tube and the jacket, with said annular space generally evacuated of air.

7. The dosing vessel of claim 1 wherein each of said low and high pressure lines are in fluid communication with a single shared transducer that is in communication with the controller.

8. The dosing vessel of claim 1 wherein the low pressure phase line is in fluid communication with a low pressure transducer and the high pressure phase line is in fluid communication with a high pressure transducer, wherein each the low and high pressure transducers are in communication with the controller.

9. The dosing vessel of claim 1 wherein the inlet valve includes a needle valve member operably connected to an inlet valve actuator, where the inlet valve actuator is in communication with the controller.

10. The dosing vessel of claim 1 wherein the low and high pressure phase lines are each positioned entirely within the insulation space.

11. The dosing vessel of claim 10 wherein the low and high pressure sensors are each mounted to the bottom end plate of the outer shell.

12. The dosing vessel of claim 1 further comprising a fill tube in fluid communication with the inlet valve, said fill tube having a fill outlet and positioned within the reservoir so that the fill outlet is positioned closer to the bottom end plate than the first end of the low pressure phase line.

13. The dosing vessel of claim 1 further comprising
h. a fill housing containing a fill chamber,
i. a liquid line extending from the inlet valve to the fill housing and configured so that cryogenic liquid flows from the inlet valve into the fill chamber when the inlet valve is open;
j. a fill tube in fluid communication with the fill chamber, said fill tube having a fill outlet and positioned within the reservoir so that the fill outlet is positioned closer to the bottom end plate than the first end of the low pressure phase line.

* * * * *